United States Patent [19]

Gladden

[11] 4,403,473
[45] Sep. 13, 1983

[54] AMMONIA/FUEL RATIO CONTROL SYSTEM FOR REDUCING NITROGEN OXIDE EMISSIONS

[75] Inventor: John R. Gladden, Metamora, Ill.

[73] Assignee: Caterpillar Tractor Co., Peoria, Ill.

[21] Appl. No.: 287,543

[22] PCT Filed: Jun. 22, 1981

[86] PCT No.: PCT/US81/00845
§ 371 Date: Jun. 22, 1981
§ 102(e) Date: Jun. 22, 1981

[87] PCT Pub. No.: WO83/00057
PCT Pub. Date: Jan. 6, 1983

[51] Int. Cl.³ .......................... F01N 3/20; F01N 3/36
[52] U.S. Cl. ........................................ 60/274; 60/286;
60/294; 422/182; 422/183; 423/212; 423/239
[58] Field of Search .................... 60/274, 286, 294;
422/182, 183; 423/212, 239 A

[56] References Cited
U.S. PATENT DOCUMENTS

| | | | |
|---|---|---|---|
| 3,599,427 | 8/1971 | Jones et al. | 60/30 |
| 3,696,618 | 10/1972 | Boyd | 60/286 |
| 3,846,981 | 11/1974 | Paczkowski | 60/286 |
| 3,900,554 | 8/1975 | Lyon | 423/235 |
| 4,155,986 | 5/1979 | Gladden | 423/212 |
| 4,188,364 | 2/1980 | Gladden | 423/213.2 |
| 4,196,170 | 4/1980 | Cemenska | 422/171 |

FOREIGN PATENT DOCUMENTS

| | | | |
|---|---|---|---|
| 1128505 | 8/1956 | France | 60/286 |
| 52-48722 | 4/1977 | Japan | 60/286 |
| 55-93917 | 7/1980 | Japan | 60/286 |

*Primary Examiner*—Douglas Hart
*Attorney, Agent, or Firm*—Anthony N. Woloch

[57] ABSTRACT

A method and apparatus is disclosed for efficiently reducing the amounts of nitrogen oxides contained in a combusted gas stream from an engine combustion chamber (14). Ammonia is reliably and instantaneously metered to the combusted gas stream conduit (24) in a preselected proportion to the fuel mass flow rate and only in response to the sensed temperature of the combusted gas stream in the reactor (26) being within a preselected range.

13 Claims, 4 Drawing Figures

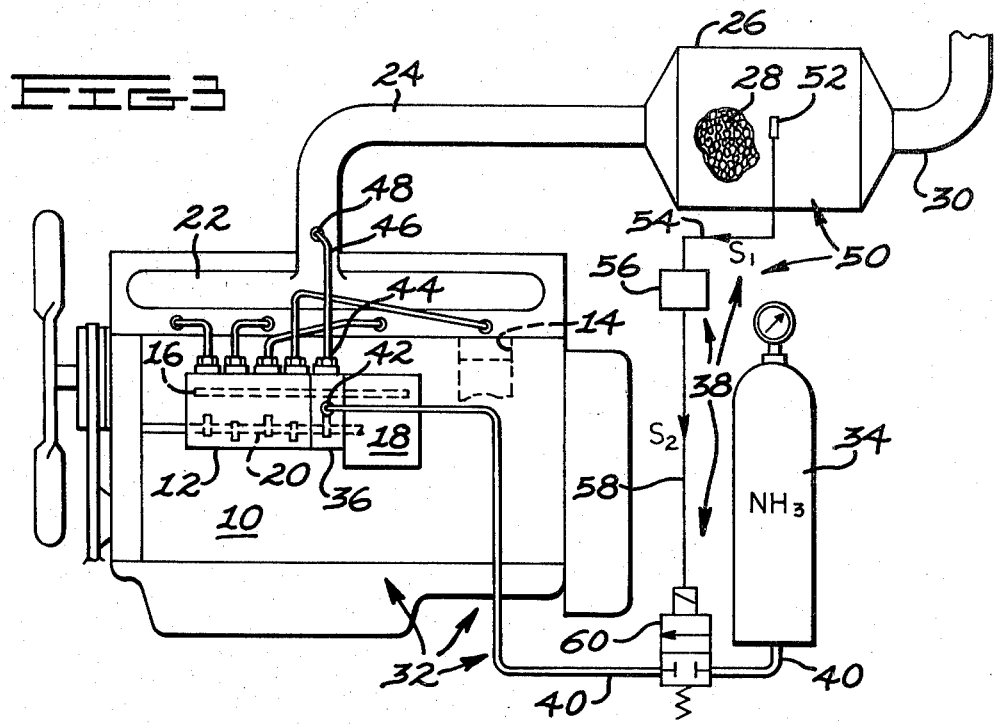
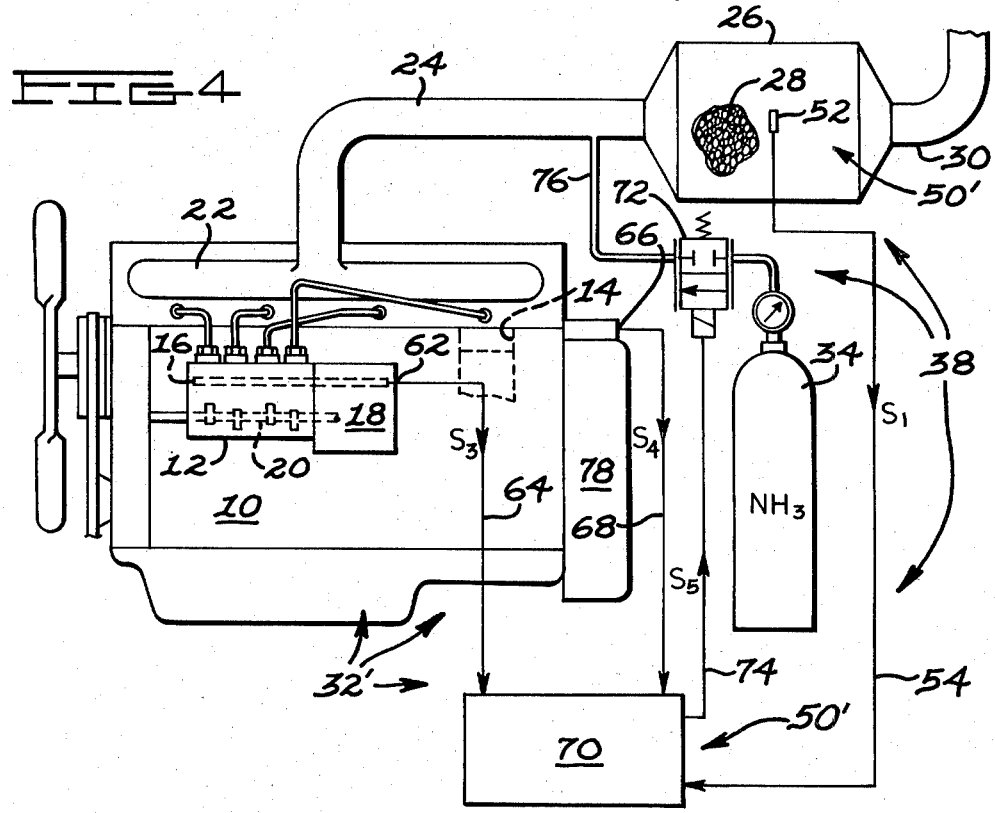

AMMONIA/FUEL RATIO CONTROL SYSTEM FOR REDUCING NITROGEN OXIDE EMISSIONS

DESCRIPTION

TECHNICAL FIELD

This invention relates generally to a control system for reducing nitrogen oxides in the combusted gas stream from an internal combustion engine and more particularly to a control system which treats the combusted gas stream with ammonia and a reactor.

BACKGROUND ART

It is known in the art to introduce small quantities of ammonia, $NH_3$, into a combusted gas stream containing nitrogen oxides such as nitric oxide, NO, and nitrogen dioxide, $NO_2$, in order to form molecular nitrogen gas, $N_2$, and water vapor, $H_2O$, thereby reducing the concentration of noxious nitrogen oxides.

In U.S. Pat. No. 3,900,554 issued to Lyon on Aug. 19, 1975, a method of reducing nitric oxide is disclosed wherein ammonia is introduced into a combusted gas stream in a specified mole ratio to the amount of nitric oxide contained in the combusted gas stream. In order for the reaction to occur, this method specifies that the combusted gas stream must be at an elevated temperature of between 704° to 1073° C. However, Lyon does not teach or suggest that his method is applicable to a diesel engine since a diesel engine's combusted gas stream temperature typically ranges from 100° to 600° C., depending on the load, thus never attaining the higher temperature range required by Lyon in order for the ammonia to react with the nitric oxide. Further, the amount of ammonia delivered to the combusted gas stream may be continually either inadequate or excessive if it is governed by analysis of the combusted gas stream. Combusted gas analysis by a conventional nitrogen oxide sensor involves a significant time lag before any change in the amount of nitrogen oxides produced is detected and the corresponding amount of ammonia delivered can be adjusted whereas the amount of nitrogen oxides in the combusted gas stream varies according to the engine load which can more rapidly change.

Another approach to the reduction of nitrogen oxides is disclosed in U.S. Pat. No. 3,846,981 issued to Paczkowski on Nov. 12, 1974 in which the combusted gas stream is heated by an afterburner which is maintained within a temperature range of 704° to 1038° C. The heated combusted gas stream is thereafter cooled by ambient air and then contacted with a gaseous nitrogen-containing compound. The amount of nitrogen-containing compound contacting the combusted gas stream is regulated in response to exhaust gas temperature or velocity, operating motor vacuum, or in response to a nitrogen oxide sensor in the combusted gas stream. However, the Paczkowski patent does not teach or suggest what quantity of nitrogen-containing compound should contact the combusted gas stream.

In order to enable ammonia to react with nitrogen oxides at typical combusted gas stream temperatures of a diesel or spark-ignited engine, it is also known to mix gaseous ammonia into the combusted gas stream, in proportion to the amount of nitric oxide contained in the combusted gas stream, and then route the gaseous mixture to a catalytic reactor. Such an approach is disclosed in U.S. Pat. No. 4,188,364 issued to Gladden on Feb. 12, 1980. The use of a catalytic reactor enables the nitrogen oxides and ammonia to be adsorbed on the catalyst bed where the reaction can occur at the normal combusted gas stream temperatures rather than at the elevated temperature range required by the Lyon or Paczkowski patents. As mentioned before, however, a conventional nitrogen oxide sensor has the disadvantage of relatively slow response as well as high cost and even unreliability if the sensor is not frequently serviced. Further, the reactor temperature varies according to engine load such that the reactor may at times be either too cold or too hot for the ammonia to react on the catalyst bed and reduce nitrogen oxides. Thus the supply of ammonia to the reactor may at times be wasted.

In summary, the above patents do not teach or suggest a way of reliably and instantaneously metering only the required amount of ammonia to the combusted gas stream in order to efficiently reduce the amounts of noxious nitrogen oxides while also conserving the supply of ammonia.

The present invention is directed to overcoming one or more of the problems as set forth above.

DISCLOSURE OF THE INVENTION

In one aspect of the present invention a method is disclosed in which ammonia is reliably and instantaneously metered to the combusted gas stream at a location between the combustion chamber and a reactor in a preselected proportion to the fuel mass flow rate supplied to the engine combustion chamber.

In another aspect of the present invention an apparatus is disclosed in which ammonia is reliably and instanteously metered to the combusted gas stream at a location between the combustion chamber and a reactor in a preselected proportion to the fuel mass flow rate supplied to the engine combustion chamber.

BRIEF DESCRIPTION OF THE DRAWINGS

FIG. 3 is a diagrammatic view of one embodiment of the apparatus for practicing the method of this invention.

FIG. 4 is a diagrammatic view of another embodiment of the apparatus for practicing the method of this invention.

BEST MODE FOR CARRYNG OUT THE INVENTION

Figure 1:
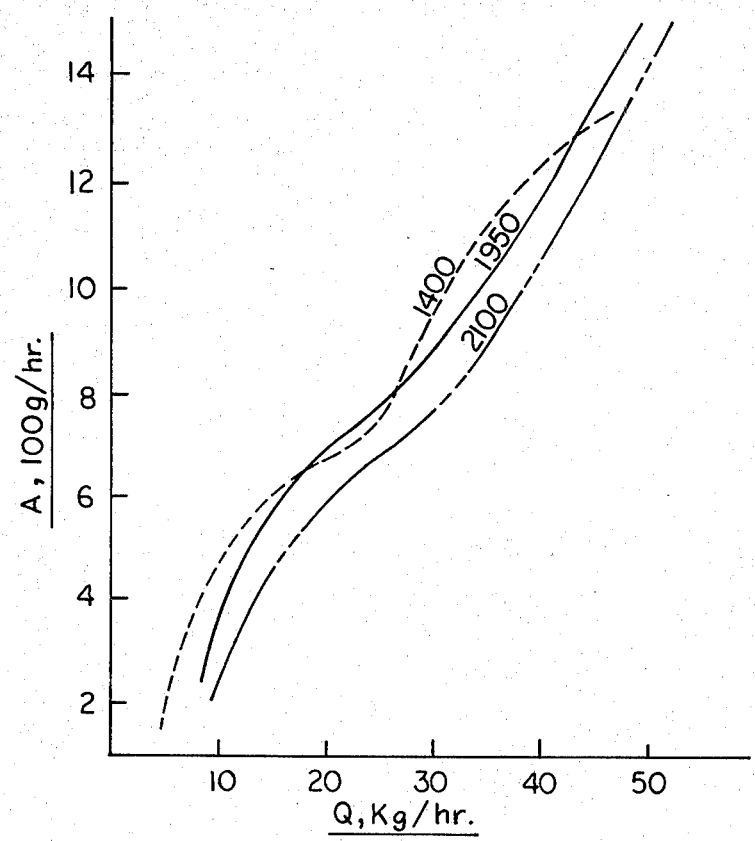
FIG. 1 is a graph plotting the amount of nitrogen oxides emitted by a typical diesel engine at various engine speeds versus the total fuel mass flow rate to the engine combustion chambers.

Referring to FIG. 1, I have experimentally determined that the amount of nitrogen oxides produced in a given diesel engine is fairly directly proportional to the total fuel mass flow rate supplied to the engine combustion chambers. FIG. 1 illustrates a particular diesel engine which is rated at 2100 rpm and whose total fuel mass flow rate, Q, and nitrogen oxide emissions, A, were monitored at varying loads while the engine was operating at 2100 rpm, 1950 rpm, and 1400 rpm. FIG. 1 shows that a substantially straight-line and directly proportional relationship between the amounts of nitrogen oxide emissions, A, and total fuel mass flow, Q, exists over a considerable speed range of the engine.

Moreover, I have determined that the amount of nitrogen oxides in the combusted gas stream from a combustion chamber of an engine can be reduced more efficiently by metering ammonia to the combusted gas stream in a preselected proportion to the fuel mass flow rate supplied to the combustion chamber. For optimum reduction of nitrogen oxides, I have determined that the ammonia should be metered in the amount between about 0.2 to 10% of the total fuel mass flow rate.

In order for the reaction between the ammonia and nitrogen oxides to occur, the ammonia is evenly dispersed throughout the combusted gas stream and the resulting unreacted gaseous mixture, normally within an exhaust temperature range of about 100° to 600° C., depending on engine load, is conducted to either a catalytic reactor or, alternatively, a thermal reactor. If a thermal reactor is chosen, it is maintained within the elevated reaction temperature range of about 700° to 1100° C. which enables the ammonia and nitrogen oxides to spontaneously react.

Figure 2:
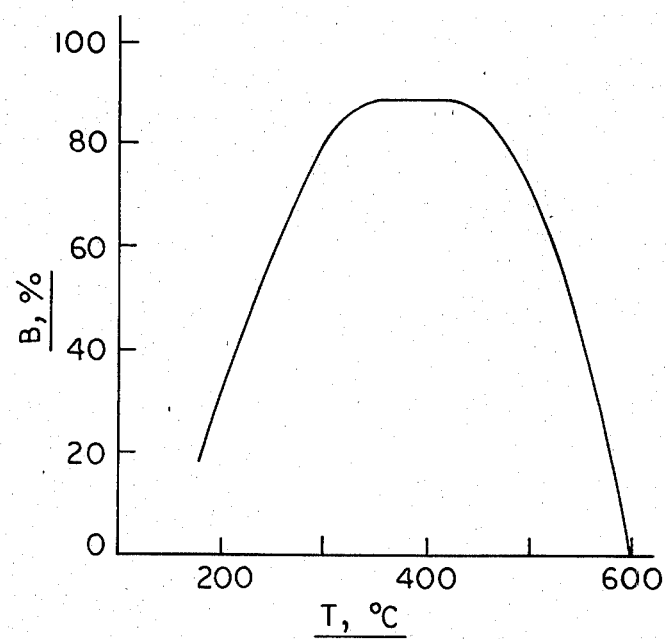
FIG. 2 is a graph plotting the amount of nitrogen oxides removed from a combusted gas stream by catalytic reaction with ammonia versus the temperature of the combusted gas stream in the reactor.

On the other hand, if a catalytic reactor is chosen, the catalyst adsorbs the ammonia and nitrogen oxides and facilitates the reaction at normal combusted gas stream temperatures without requiring the elevated reaction temperature. However, as FIG. 2 illustrates, the amount of nitrogen oxides removed by catalytic reaction with ammonia varies according to the temperature of the combusted gas stream within the catalytic reactor which in turn varies according to the engine load. In FIG. 2 the percentage of nitrogen oxide removal, B, is plotted against the temperature, T, of the combusted gas stream within a representative catalytic reactor, for example, a metal oxide catalytic reactor. At temperatures below about 100° C. no significant nitrogen oxide removal is achieved and the ammonia passes through the exhaust system unreacted. Maximum reduction of nitrogen oxides, being in excess of 80%, is achieved when the temperature is between about 300° to 500° C. On the other hand, at temperatures above about 600° C. the catalytic reactor actually produces additional nitrogen oxides from the ammonia. Generally, catalytic reactors exhibit a preferred temperature range of about 50° to 800° C. below which the ammonia passes unreacted through the reactor and above which the ammonia reacts with oxygen to produce additional noxious nitric oxide. Consequently, the present invention is also directed at conserving the supply of ammonia such that it is not only accurately metered but supplied only when it is beneficial for the reduction of nitrogen oxides. Conservation of the ammonia supply is especially important in mobile engine applications where the capacity for carrying a supply of ammonia and the frequency of replenishment may be limited.

Referring more particularly to FIG. 3 and FIG. 4 wherein similar reference characters designate corresponding parts throughout both figures, there are shown two alternate embodiments of a nitrogen oxide control system for practicing the method of this invention.

In FIG. 3 the amount of ammonia metered is mechanically determined in proportion to the fuel mass flow rate. An engine generally indicated at 10, includes one or more conventional fuel injection pumps 12 which meter and pump fuel to the respective engine combustion chambers, such as the one shown schematically at 14, in an amount per unit time determined by the engine speed and the position of a conventional fuel pump rack 16 which are controlled by a conventional governor 18.

The combustion chambers 14 are connected to an exhaust manifold 22 which is connected to or is integral with a common combusted gas stream conduit 24. The conduit 24 is connected to a reactor 26. The reactor may either be a conventional catalytic reactor or, alternatively, a conventional thermal reactor. If a catalytic reactor is used, suitable well known catalyst beds 28 for the catalytic reactor 26 would include, for example, the zeolite catalysts such as hydrogen exchanged mordenite zeolite, $H_8O_4 (Al_2O_3)_4 (SiO_2)_{40}.24 H_2O$, the metal catalysts such as platinum, the metal oxide catalysts such as iron oxide or vanadium pentoxide, $V_2O_5$, on alumina support, or any of the known catalyst compositions described in U.S. Pat. No. 4,155,986 issued to Gladden on May 22, 1979 or U.S. Pat. No. 4,188,364 issued to Gladden on Feb. 12, 1980. An exhaust stack 30 is connected to the reactor 26 for venting the combusted gas stream to atmosphere.

A means 32 is provided for reliably and instantaneously metering ammonia to the conduit 24 in a preselected proportion to the fuel mass flow rate supplied to the engine combustion chambers 14 and in response to the sensed temperature of the combusted gas stream in the reactor 26 being within a preselected range. The ammonia metering means 32 includes a reservoir or tank 34 of ammonia, an ammonia pump 36, and a means 38 for supplying the flow of ammonia to the ammonia pump 36 in response to the sensed temperature of the combusted gas stream in the reactor 26 being within a preselected range.

The ammonia in reservoir 34 is, for example, either anhydrous ammonia or an aqueous solution of ammonia and is pressurized within the reservoir 34 at about 690 kpa to maintain the ammonia in the liquid phase at ambient temperatures. The reservoir 34 is connected by a line 40 to an inlet 42 of ammonia pump 36.

The ammonia pump 36 is, for example, similar in construction to the fuel injection pumps 12 although the ammonia pump 36 differs in that it develops a relatively lower pressure and also has a relatively smaller pumping displacement which is sized in a preselected proportion to the total fuel mass flow rate delivered by the fuel injection pumps 12. Depending on the type of engine, type of fuel burned, type of reactor 26 selected, and amount of nitrogen oxide removal desired, the pumping displacement of the ammonia pump 36 is sized to meter and pump ammonia in an amount of between about 0.2 to 10% of the total fuel mass flow rate supplied by the fuel injection pumps 12. For the particular engine illustrated in FIG. 1, using a hydrogen exchanged mordenite zeolite catalyst bed 28, I have determined ammonia metered in the proportion of about 1% of the total fuel mass flow rate supplied results in about an 80% reduction of nitrogen oxides when compared to the untreated combusted gas stream. Both the fuel injection pumps 12 and the ammonia pump 36 are actuated by the camshaft 20, which rotates in preselected proportion to engine speed, and controlled by the fuel pump rack 16 so that the proper amount of ammonia is reliably and instantaneously metered according to the fuel mass flow rate. By accurately metering the proper amount of ammonia this way, the supply of ammonia is thereby conserved.

Since ammonia has poor lubricating qualities compared to conventional diesel fuel, suitable lubrication for the ammonia pump 36 may be provided by any of the well known lubricating systems such as those disclosed in, for example, U.S. Pat. No. 2,010,696 issued to L'Orange on Aug. 6, 1935 or U.S. Pat. No. 2,278,395 issued to Lichte et al on Mar. 31, 1942.

A pumping outlet 44 of the ammonia pump 36 is connected by a line 46 to a relatively low-pressure normally-closed injection nozzle or check valve 48. The injection nozzle 48 is connected to the conduit 24 and sprays liquid ammonia into the conduit 24 each time the ammonia pump 36 develops, for example, about 1400 kpa. The above valve opening pressure of injection nozzle 48 may be any minimum pressure which maintains the ammonia in the liquid phase, throughout the ammonia metering means 32, and yet sufficiently disperses the liquid ammonia into the combusted gas stream in the conduit 24 where the liquid ammonia vaporizes.

In order to speed up the catalyst or, alternatively, thermal reaction between the ammonia and nitrogen oxides, it is well known to also provide a small amount of unburnt oxygen, at least about 1%, in the combusted gas stream. In the case of a spark-ignited engine the unburnt oxygen is provided, for example, by either adjusting the engine to a lean fuel setting or supplying an auxiliary supply of air to the conduit 24. In the case of a diesel engine, the unburnt oxygen is inherently provided in the combusted gas stream in an amount between about 1 to 20% which adequately speeds the reduction.

The ammonia supplying means 38 includes a means 50 for sensing the temperature of the combusted gas stream in the reactor 26 and a normally-closed valve 60 connected to the temperature sensing means 50. The valve 60 is interposed in line 40, between the ammonia reservoir 34 and ammonia pump 36, and is movable between a first or closed position at which the valve 60 blocks the supply of ammonia to the conduit 24 and a second or open position at which the valve 60 communicates the supply of ammonia to the conduit 24. The valve 60 is moved to the second or open position in response to the sensed temperature being within a preselected range. The valve 60 is, for example, a solenoid-controlled valve which is normally biased to the first or closed position.

The temperature sensing means 50 includes, for example, a temperature sensor 52, such as a thermocouple, and a minimum-maximum power amplifier 56. The temperature sensor 52 is attached to the reactor 26 and also connected by way of a signal line 54 to the minimum-maximum power amplifier 56. The amplifier is connected by way of a signal line 58 to the valve 60. The temperature sensor 52 is adapted to provide a temperature signal, $S_1$, responsive to the temperature of the combusted gas stream within the reactor 26. The temperature sensor 52 transmits its signal, $S_1$, by way of signal line 54 to the minimum-maximum power amplifier 56 which is preset for determining whether the sensed temperature is within a preferred range for the particular reactor 26 used.

In the event that the signal, $S_1$, indicates that the particular reactor 26 is either too cold or too hot to make beneficial use of the ammonia in reducing nitrogen oxides, the minimum-maximum power amplifier 56 does not transmit any signal by way of signal line 58 and the valve 60 remains closed thus conserving the supply of ammonia in the reservoir 34. In the event that the signal, $S_1$, indicates that the particular reactor 26 is operating within a temperature range where the use of ammonia is beneficial for reducing nitrogen oxides, the minimum-maximum power amplifier 56 transmits an actuating signal, $S_2$, by way of signal line 58 to the valve 60 which causes the valve 60 to open and communicate the flow of ammonia from the reservoir 34 to the ammonia pump 36.

Alternatively, the temperature sensing means 50 may, for example, include a thermostat (not shown) which is mechanically or electrically linked to the valve 60.

Regardless of what type of ammonia supplying means 38 is chosen, when a catalytic reactor 26 is used, the valve 60 is moved to the second or open position only when the sensed temperature is generally in the range of about 50° to 800° C. For example, for metal or metal oxide catalyst beds 28, the preferred temperature range is about 100° to 600° C. and, more particularly, about 150° to 550° C. for a vanadium pentoxide composition. Moreover, for zeolite catalyst beds 28, the preferred temperature range is about 100° to 800° C. and, more particularly about 250° to 800° C. for a hydrogen exchanged mordenite zeolite composition.

In FIG. 4 the amount of ammonia metered is electronically determined in proportion to the fuel mass flow rate. The embodiment of FIG. 4 departs from the embodiment of FIG. 3 in that, in lieu of using liquid ammonia, the ammonia pump 36, the minimum-maximum power amplifier 56, and the valve 60, the ammonia metering means 32' includes a normally-closed throttling valve 72, a pressurized reservoir 34 of gaseous ammonia, a means 62 for sensing the position of the fuel rack 16 and providing a representative signal, $S_3$, which directly relates to the quantity of total fuel supplied per engine revolution, and a means 66 for simultaneously sensing the engine speed and providing a representative signal, $S_4$. The ammonia metering means 32' of FIG. 4 further includes a directing means 70, such as a logic system power amplifier, for receiving the rack position signal, $S_3$, by way of signal line 64 and the engine speed signal, $S_4$, by way of signal line 68 and performing appropriate calculation to reliably and instantaneously determine the fuel mass flow rate. The logic system power amplifier 70 also receives the temperature signal, $S_1$, from the temperature sensing means 50 by way of signal line 54.

Valve 72 differs from the valve 60 of FIG. 3 only in that its second or open position is variable and is connected to the logic system power amplifier 70 by way of a signal line 74. In the event that the temperature signal, $S_1$, indicates that the particular reactor 26 is either too hot or too cold to make beneficial use of the ammonia in reducing nitrogen oxides, the logic system power amplifier 70 will not transmit any signal by way of the signal line 74 and the throttling valve 72 will remain closed thus conserving the supply of ammonia in reservoir 34. In the event that the temperature signal, $S_1$, indicates that the particular reactor 26 is operating within a temperature range where the use of ammonia effectively reduces nitrogen oxides, the logic system power amplifier 70 emits a signal, $S_5$, by way of the signal line 74, which modulates the throttling valve 72 at its variably second or open position thereby reliably and instantaneously metering the amount of gaseous ammonia supplied, by way of line 76, to the conduit 24 in a preselected proportion to the fuel mass flow rate.

Throttling valve 72 is biased in the first or closed position and is, for example, a solenoid-controlled multiplicity of orifices which can be selectively opened and closed in various combinations to provide a very reliable, variably step control of the ammonia flow rate.

Alternatively, the throttling valve 72 may be an infinitely variable butterfly valve.

Although the engine speed sensor means 66 in FIG. 4 is shown sensing speed at the engine flywheel 78, it may be located to sense engine speed elsewhere, such as at the flyweight carrier of the governor 18 or at the camshaft 20 of the fuel injection pump 12 without departing from the scope of the invention.

Alternatively, the fuel rack position sensor means 62 and engine speed sensor means 66 may be replaced by a conventional fuel flow rate sensor means (not shown) which directly and instantaneously measures fuel mass flow rate and emits a representative signal to the logic system power amplifier 70 which then directs the throttling valve 72 to meter the preselected proportional amount of ammonia supplied to conduit 24.

INDUSTRIAL APPLICABILITY

Having determined that the amount of nitrogen oxides produced in the combusted gas stream is substantially directly proportional to the amount of fuel mass flow rate supplied to the engine combustion chambers 14, my invention meters ammonia to the combusted gas stream in a preselected proportion to the fuel mass flow rate in order to efficiently reduce the amount of noxious nitrogen oxides.

In the embodiment shown in FIG. 3, the speed of camshaft 20 and the position of the fuel pump rack 16 of the fuel pumps 12 determine the fuel mass flow rate supplied to the engine combustion chambers. Since the amount of liquid ammonia pumped by the ammonia pump 36 is also determined by the camshaft speed and the position of the fuel pump rack 16, the correct preselected proportion of ammonia to the fuel mass flow rate is reliably and instantaneously metered. As long as the temperature of the combusted gas stream within the reactor 26 normally falls within the preselected temperature range where the introduction of ammonia is beneficial, the temperature signal, $S_1$, from temperature sensor 52 causes the minimum-maximum power amplifier 56 to emit an actuating signal, $S_2$, to move the normally-closed valve 60 to its second or open position where the valve 60 communicates the liquid ammonia supply to the ammonia pump 36, and thence to the conduit 24. Should the temperature of the combusted gas stream within the reactor 26 fall outside the preselected temperature range so that the introduction of ammonia is not beneficial, the minimum-maximum power amplifier 56 will not emit an actuating signal, $S_2$, to the valve 60 and the valve 60 will move to its first or closed position thereby conserving the supply of liquid ammonia.

In the alternative embodiment of FIG. 4, the fuel rack position sensor means 62 and the engine speed sensor means 66 provide representative input signals, $S_3$ and $S_4$, to the logic system power amplifier 70 which performs appropriate calculation to reliably and instantaneously determine the amount of fuel mass flow rate and the corresponding proportional amount of ammonia required to remove nitrogen oxides from the combusted gas stream. The logic system power amplifier 70 then emits a modulating signal, $S_5$, to move the normally-closed throttling valve 72 to its variable second or open position at which the valve meters the amount of gaseous ammonia being introduced in conduit 24 in a preselected proportion to the fuel mass flow rate. Should the temperature of the combusted gas stream within the reactor 26 fall outside the preselected temperature range so that the introduction of ammonia is not beneficial, the temperature signal, $S_1$, from temperature sensor 52 causes the logic system power amplifier to not transmit any modulating signal to the throttling valve 72 which then moves to its first or closed position thereby blocking and conserving the supply of gaseous ammonia.

In one embodiment of the present invention in which a hydrogen exchanged mordenite zeolite catalyst was used, ammonia supplied in the proportion of about 1% of the total fuel mass flow rate supplied resulted in about an 80% reduction of nitrogen oxides from the exhaust gas stream.

In summary, this invention reliably and instantaneously meters the correct amount of ammonia to the combusted gas stream in a preselected proportion to the fuel mass flow rate in order to efficiently reduce the amounts of noxious nitrogen oxides.

Other aspects, objects, and advantages of this invention can be obtained from a study of the drawings, the disclosure and the appended claims.

I claim:

1. A method of reducing the amounts of oxides of nitrogen contained in a combusted gas stream from an engine combustion chamber, comprising the steps of:
    conducting the combusted gas stream to a reactor; and
    metering ammonia to the combusted gas stream at a location between said combustion chamber and said reactor in a preselected proportion to the fuel mass flow rate supplied to said engine combustion chamber wherein the step of metering ammonia includes the step of metering the amount of ammonia in response to a fuel pump rack position and engine speed.

2. The method as in claim 1 wherein the step of metering the ammonia includes pumping the ammonia to the combusted gas stream at said location.

3. The method as in claim 2 wherein the step of metering ammonia includes maintaining the ammonia in the liquid phase.

4. The method of claim 1 wherein the step of metering ammonia includes:
    sensing the position of the fuel pump rack and providing a representative signal;
    sensing the engine speed and providing a representative signal;
    computing the fuel mass flow supplied to the engine combustion chamber from said fuel rack position signal and said engine speed signal; and
    metering the ammonia to said location in a preselected proportion to said computed fuel mass flow.

5. The method as in claim 4 wherein the step of metering ammonia includes maintaining the ammonia in a gaseous phase.

6. The method of claim 1 wherein said preselected proportion is about 0.2 to 10 percent.

7. An emission control system for reducing the oxides of nitrogen contained in a combusted gas stream from a combustion chamber (14) of an engine (10) comprising:
    a reactor (26);
    a conduit (24) connected between said combustion chamber (14) and said reactor (26); and
    means (32) for metering the ammonia to the conduit (24) in a preselected proportion to the fuel mass flow rate supplied to the engine combustion chamber (14) wherein said engine (10) includes a fuel pump rack (16) and wherein said means (32) for metering ammonia meters ammonia to the conduit

(24) in response to the position of the fuel pump rack (16) and the engine speed.

8. The emission control system as in claim 7 wherein said ammonia metering means (32) includes:
   a reservoir of ammonia (34); and
   an ammonia pump (36) connected between said ammonia reservoir (34) and said conduit (24) and controlled by the position of said fuel pump rack (16) and the speed of said engine (10).

9. The emission control system as in claim 8 wherein said ammonia metering means (32) includes:
   an injection nozzle 48 connected between the ammonia pump (36) and said conduit (24).

10. The emission control system as in claim 9 wherein said ammonia supplied to the conduit (24) in a liquid phase.

11. The emission control system as in claim 7 wherein said ammonia metering means (32') includes:
   a reservoir (34) of ammonia;
   a throttling valve (72) connected between the reservoir (34) and the conduit (24);
   means (62) for sensing the position of the fuel pump rack (16) and providing a representative signal ($S_3$);
   means (66) for simultaneously sensing the speed of the engine (10) and providing a representative signal ($S_4$); and
   means (70) for directing a modulating signal ($S_5$) to said throttling valve (72) in response to said rack position signal ($S_3$) and engine speed signal ($S_4$).

12. The emission control system as in claim 11 wherein said ammonia is supplied to the conduit (24) in a gaseous phase.

13. The emission control system as in claim 7 wherein said preselected proportion is about 0.2 to 10 percent.

* * * * *